US010853872B1

(12) United States Patent
Collins et al.

(10) Patent No.: US 10,853,872 B1
(45) Date of Patent: Dec. 1, 2020

(54) ADVANCED ITEM ASSOCIATIONS IN AN ITEM UNIVERSE

(71) Applicant: Amazon Technologies, Inc., Seattle, WA (US)

(72) Inventors: Brian Joseph Collins, Woodinville, WA (US); Adam Russell Bains, Seattle, WA (US); Arka Banerjee, Telangana (IN); Joy Yuzi Chang, Seattle, WA (US); Rajashekhar Goli, Telangana (IN); Alexander Lee Harrington, Kenmore, WA (US); Jennifer Marie Lin, Seattle, WA (US); Chad Christopher Moran, Kirkland, WA (US); Venkata Sai Phani Kumar, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 737 days.

(21) Appl. No.: 15/187,483

(22) Filed: Jun. 20, 2016

(51) Int. Cl.
| | |
|---|---|
| *G06Q 30/00* | (2012.01) |
| *G06Q 30/06* | (2012.01) |
| *G06Q 10/08* | (2012.01) |
| *G06F 3/0481* | (2013.01) |
| *H04L 29/08* | (2006.01) |

(52) U.S. Cl.
CPC ....... *G06Q 30/0641* (2013.01); *G06F 3/0481* (2013.01); *G06Q 10/083* (2013.01); *G06Q 30/0601* (2013.01); *G06Q 30/0621* (2013.01); *G06Q 30/0623* (2013.01); *H04L 67/18* (2013.01)

(58) Field of Classification Search
CPC ............. G06Q 10/083; G06Q 30/0601; G06Q 30/0621; G06Q 30/0623; G06Q 30/0641; G06F 3/0481; H04L 67/18
See application file for complete search history.

(56) References Cited

U.S. PATENT DOCUMENTS

| | | | |
|---|---|---|---|
| 6,336,100 B1 * | 1/2002 | Yamada ................. | G06Q 30/06 705/26.8 |
| 7,197,475 B1 * | 3/2007 | Lorenzen ............... | G06Q 30/02 235/383 |
| 7,793,838 B2 * | 9/2010 | Appleyard ............. | G06Q 20/12 235/383 |
| 7,974,888 B2 * | 7/2011 | Kane, Jr. ................ | G06Q 30/02 705/26.7 |

(Continued)

OTHER PUBLICATIONS

"A Dynamic Web Mining Framework for E-Learning Recommendations using Rough Sets and Association Rule Mining," by A. Anitha and Dr. N. Krishnan, International Journal of Computer Applications, vol. 12, No. 11, Jan. 2011 (Year: 2011).*

(Continued)

*Primary Examiner* — Anne M Georgalas (74) *Attorney, Agent, or Firm* — Thomas Horstemeyer, LLP (57) ABSTRACT

Disclosed are various embodiments for facilitating item bundles. An item bundle includes more than one item from an item universe that can be bundled together. For example, in an electronic marketplace, two items can be linked together as a bundle that is sold. An order document can be created that includes a reference to the item bundle that is associated with an entry for each of the items in the bundle.

20 Claims, 10 Drawing Sheets

(56) References Cited

U.S. PATENT DOCUMENTS

| | | | | |
|---|---|---|---|---|
| 8,266,017 B1* | 9/2012 | Dearlove | ............... | G06Q 30/02 |
| | | | | 705/26.7 |
| 8,290,818 B1* | 10/2012 | Levitan | .............. | G06Q 30/0631 |
| | | | | 705/26.7 |
| 8,438,052 B1* | 5/2013 | Chanda | .............. | G06Q 30/0282 |
| | | | | 705/7.11 |
| 8,630,923 B2* | 1/2014 | Rothman | ............... | G06Q 30/02 |
| | | | | 705/26.1 |
| 8,831,998 B1* | 9/2014 | Cramer | .............. | G06Q 20/1235 |
| | | | | 705/59 |
| 8,856,013 B1* | 10/2014 | Spiegel | ................ | G06Q 10/083 |
| | | | | 705/330 |
| 10,275,485 B2* | 4/2019 | Joshi | ........................ | G06F 16/29 |
| 2003/0105682 A1* | 6/2003 | Dicker | .............. | G06Q 30/0633 |
| | | | | 705/26.8 |
| 2004/0002903 A1* | 1/2004 | Stolfo | .................. | G06Q 10/087 |
| | | | | 705/74 |
| 2011/0238545 A1* | 9/2011 | Fanaian | ................. | G06Q 30/02 |
| | | | | 705/34 |
| 2014/0180861 A1* | 6/2014 | Basavaiah | .......... | G06Q 30/0605 |
| | | | | 705/26.2 |
| 2015/0193859 A1* | 7/2015 | Colello | .............. | G06Q 30/0635 |
| | | | | 705/14.23 |
| 2017/0024804 A1* | 1/2017 | Tepfenhart, Jr. | ... | G06Q 30/0635 |

OTHER PUBLICATIONS

"A new era in bike retailing, with new details to address: Trek omnichannel program inspires big thinking, close scrutiny," by Steve Frothingham, Bicycle Retailer and Industry News 24.15: 1(3), Sep. 1, 2015 (Year: 2015).*

* cited by examiner

Select Professional Assembly Type:

● Ship to Store – For assembly and pickup
○ At home – Provider comes to you (additional charges may apply)

Zip code: 10280

● Neighborhood Bike Shop
121 Wall St
New York, NY

○ City Bike Shop
9 Fulton St
New York, NY

○ Open Bike Shop
645 MLK Dr
New York, NY

Select Shipping Options

Shipment 1

Performance Shirt

- ● Standard Shipping
  Arrives by October 5
- ○ Express Shipping
  Arrives by October 1

Shipping Address:
123 Elm St
New York, NY

[ Change ]

Shipment 2

BikeCo Racer Road Bike

- ● Standard Shipping
  Available for pick-up on or after October 7
- ○ Express Shipping
  Available for pick-up on or after October 3

Pick-up from:
Neighborhood Bike Shop
121 Wall St
New York, NY

[ Place your order ]

```
keyValuePairList => [
  {
    value => '84af570b-c696-4d17-bc2c-4a1e3ae8ebf6',
    key => 'itemAssoc'
  },
  {
    value => '1454443822',
    key => 'addToCartTime'
  },
  {
    value => '805-8367587-9255004',
    key => 'sessionID'
  },
  {
    value => 'new',
    key => 'Condition'
  },
  {
    value => 'new',
    key => 'ConditionType'
  },
  {
    value => 'BikeCo Racer Road Bike',
    key => 'itemName'
  },
]
```

FIG. 3

```
keyValuePairList => [
  {
    value => '84af570b-c696-4d17-bc2c-4a1e3ae8ebf6',
    key => 'itemAssoc'
  },
  {
    value => '1454443835',
    key => 'addToCartTime'
  },
  {
    value => '805-8367587-9255004',
    key => 'sessionID'
  },
  {
    value => 'In-store Bike Assembly',
    key => 'itemName'
  }
]
```

FIG. 7

ADVANCED ITEM ASSOCIATIONS IN AN ITEM UNIVERSE

BACKGROUND

Items within an item universe, such as a product catalog, an item repository, a corpus of search results, a search index, or any other form of item repository, have individualized properties. These individualized properties can include an identifier, metadata, text properties, multimedia, or any other properties or data. In some scenarios, items might be related to or contingent upon one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application is directed to creating item associations that relate multiple items to one another within an item universe. In the context of this disclosure, an item universe can include a product catalog, a collection of items accessible by a search engine, or any other item repository. In the case of an electronic commerce system, two or more items can be related to one another or be contingent upon one another. For example, a physical item might be sold along with another item, such as an assembly or installation service for the item, that is related to the physical item. In this scenario, the assembly or installation service might only be appropriate for the physical item or might be unavailable for sale without the sale of the physical item in the same transaction.

However, in a preexisting transaction processing framework or a preexisting catalog framework, it might be difficult to interrelate items in this way. Accordingly, examples of this disclosure provide the ability for items to be related to one another in an electronic commerce framework by creating an object that allows items to be uniquely related to one another within an item universe. Accordingly, a transaction processor that processes electronic commerce transactions or operations related to a virtual shopping cart can identify interrelations between items in a session or a virtual shopping cart by analyzing such an object that can be placed within the session or virtual shopping cart. The transaction processor can then be configured to various types of transaction processing logic to the related items.

Figure 1A:
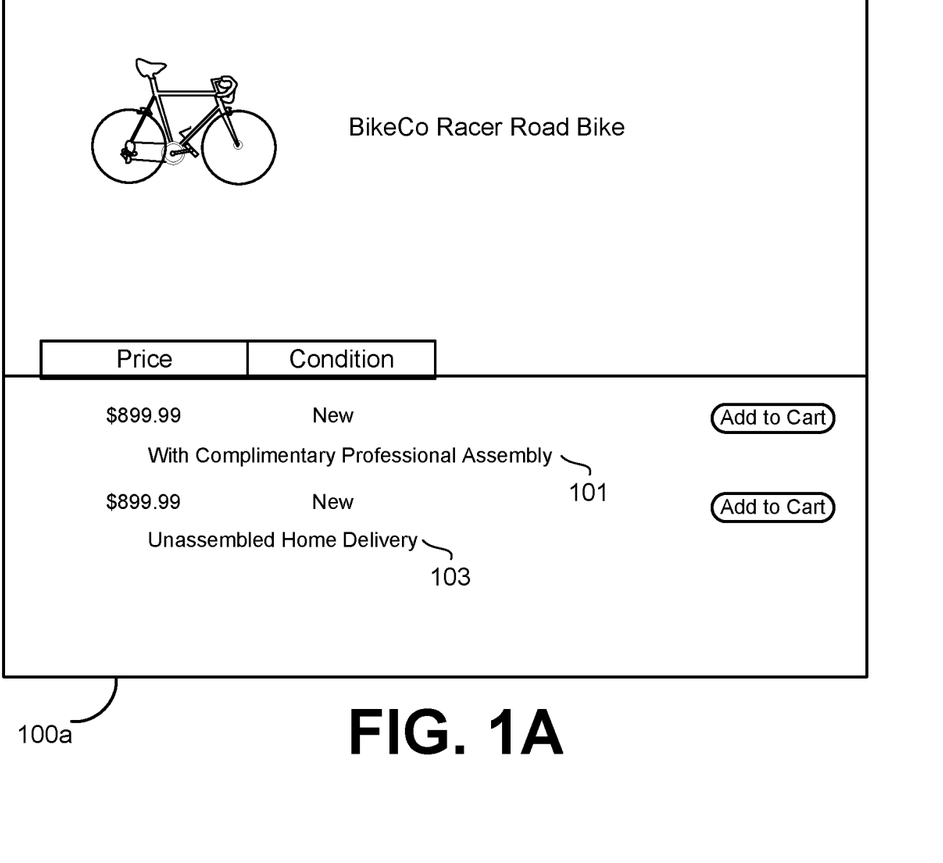
FIG. 1A-1D are pictorial diagrams of an example user interface according to embodiments of the disclosure.

Turning now to FIG. 1A, shown is a pictorial diagram of an example user interface according to embodiments of the disclosure. In the example scenario, a user interface 100a is depicted which includes a product detail page, or a user interface 100a in which information about an item within an item universe, is displayed. The user interface 100a can be generated by an application or logic that retrieves information, imagery or video pertaining to the item from an item repository and assembles a page that can be rendered by a browser or special purpose application on a user's device.

As shown in the example user interface 100a, there might be multiple purchase options for the item. For purchase option 101, the item can be offered with an assembly service. For purchase option 103, the item may be sold without being offered with any services or any other item. In the context of an item catalog, the professional assembly service for the item can exist as a separate and distinct item within the catalog with its own identifier, properties and other metadata. In contrast, purchase option 103 can be sold to a user without offering the item shown in the user interface 100a with any other item. Accordingly, embodiments of the disclosure can generate a bundle, or an item association between two or more items, that uniquely links the items within an item universe once the item is associated with a user session. In the case of an electronic commerce environment, the item association can be created once the items are added to the user's shopping cart.

To generate the user interface 100a, a network site application can determine whether data associated with the item in an item repository links the item with other items. The network site application can then present the two or more items together. Once the linked items are added to a user's virtual shopping cart, an item association identifier is generated that uniquely associates the items together so that a bundle of items is formed. The bundle of items is unique even with respect to a bundle of the same items that another user has added to his or her respective virtual shopping cart or another bundle of the same items that might be in the same shopping cart. In other words, only items that are associated with the item association identifier in a data representation of the shopping cart or user session are a part of the bundle. In this way, bundles of items can be created by including an item association identifier within the data that represents a user session or a virtual shopping cart of a user.

Figure 1B:
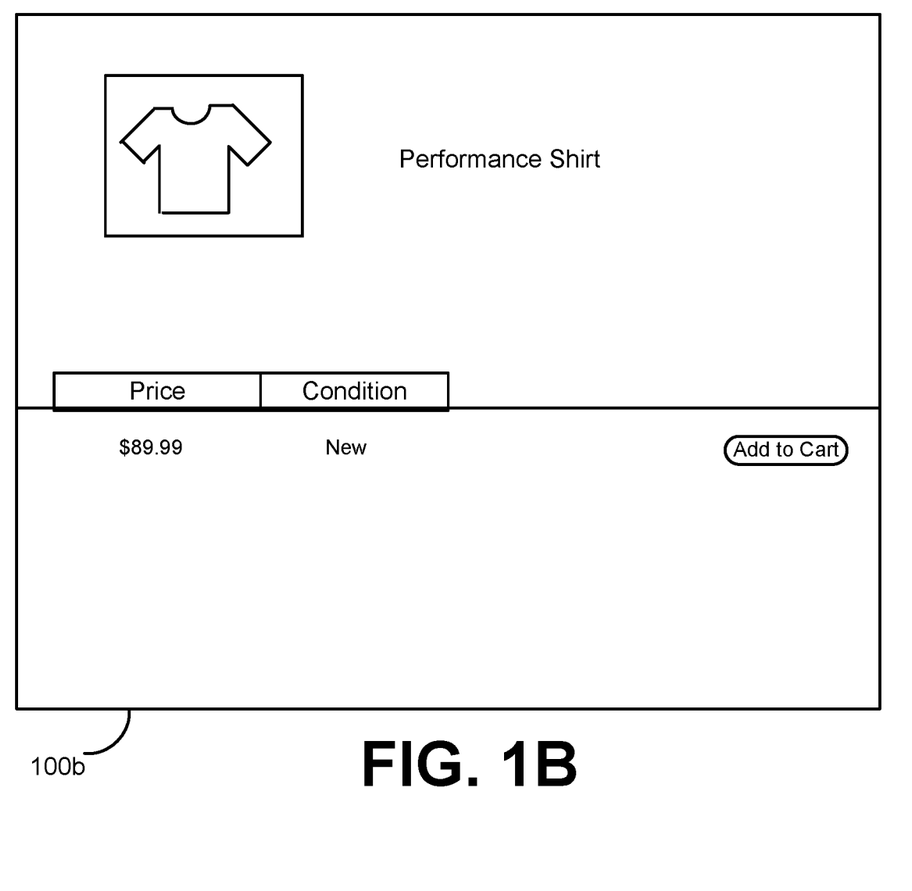

Referring next to FIG. 1B, shown is an example of a user interface 100b in which information about another item from the item universe is displayed. In the example of FIG. 1B, the user interface 100b can also be generated by an application or logic that retrieves information pertaining to the item from an item repository and assembles a page. Because the item is not linked with another item from the item universe, the user interface 100b does not include information about other items to which the item is linked.

Figure 1C:
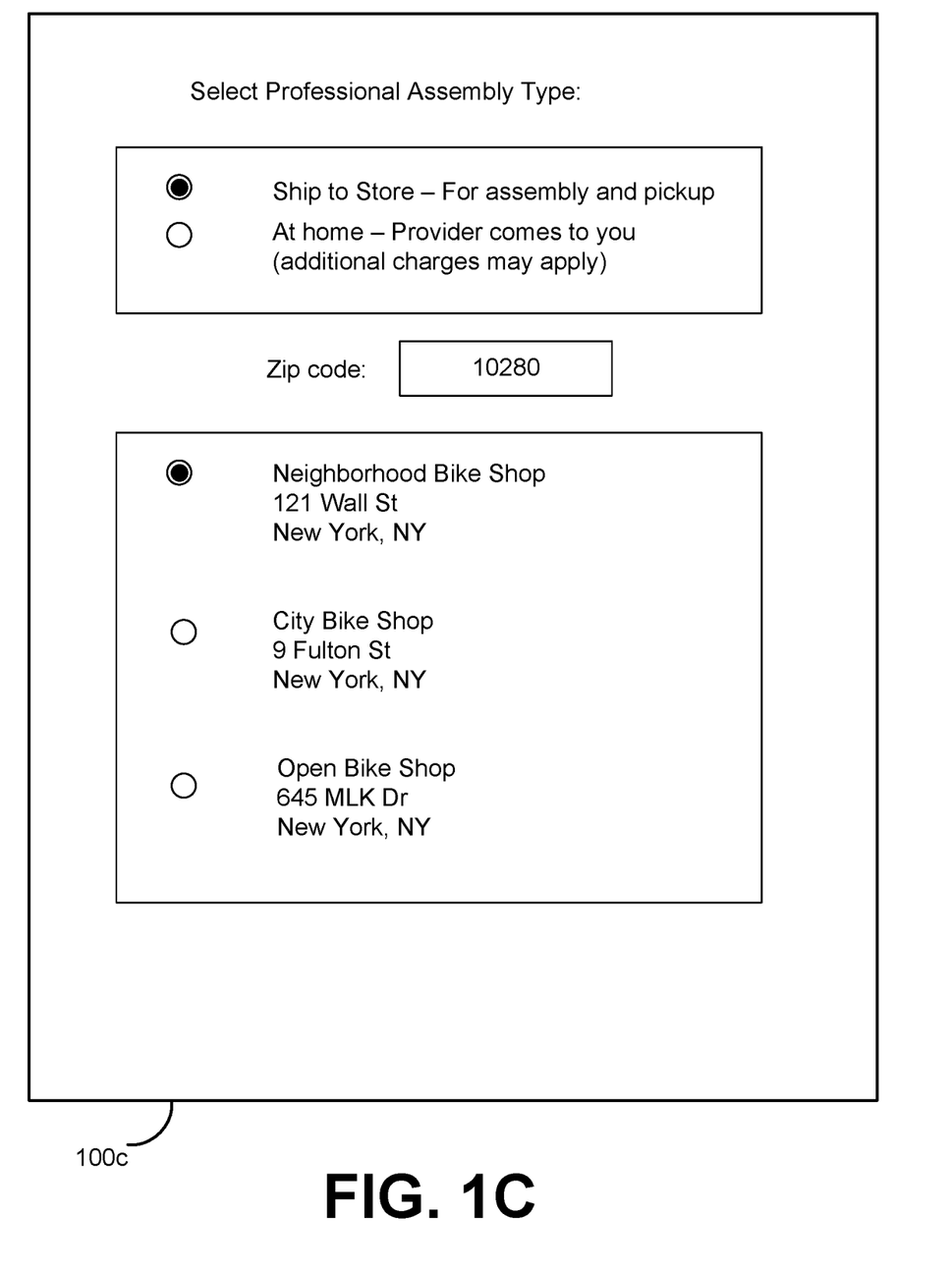

Continuing the example of FIGS. 1A-1B, reference is now made to FIG. 1C, which illustrates an example of a user interface 100c generated by embodiments of the disclosure. The user interface 100c can display information about an item association between two items from the item universe. In the example of FIG. 1C, a user has added the item associated with purchase option 101 to a virtual shopping cart associated with a user session. In response, a user interface 100c can be generated that displays information about an item association between two items that is linked with the purchase option. In the case of FIG. 1C, the first item is associated with a second item that is a service provided by a service provider. For example, the first item is a bike sold through an electronic commerce site and the second item is professional assembly of the bike by a service provider, such as a bike shop.

Accordingly, upon adding the combination of the first item and second item to a user session or virtual shopping cart, an item association can be created between the two items that the user can be prompted to select or configure options that are related to one or more of the items in the bundle. In the example of FIG. 1C, the user is presented with a user interface that presents information about the bundle and is requested to select a service provider and options that are associated with an assembly service. The user is also presented with information about a location of a service provider. In this context, the location of the service provider can act as a shipping address or shipping location to which the item in the bundle is sent so that a specified service can be performed by the service provider.

Figure 1D:
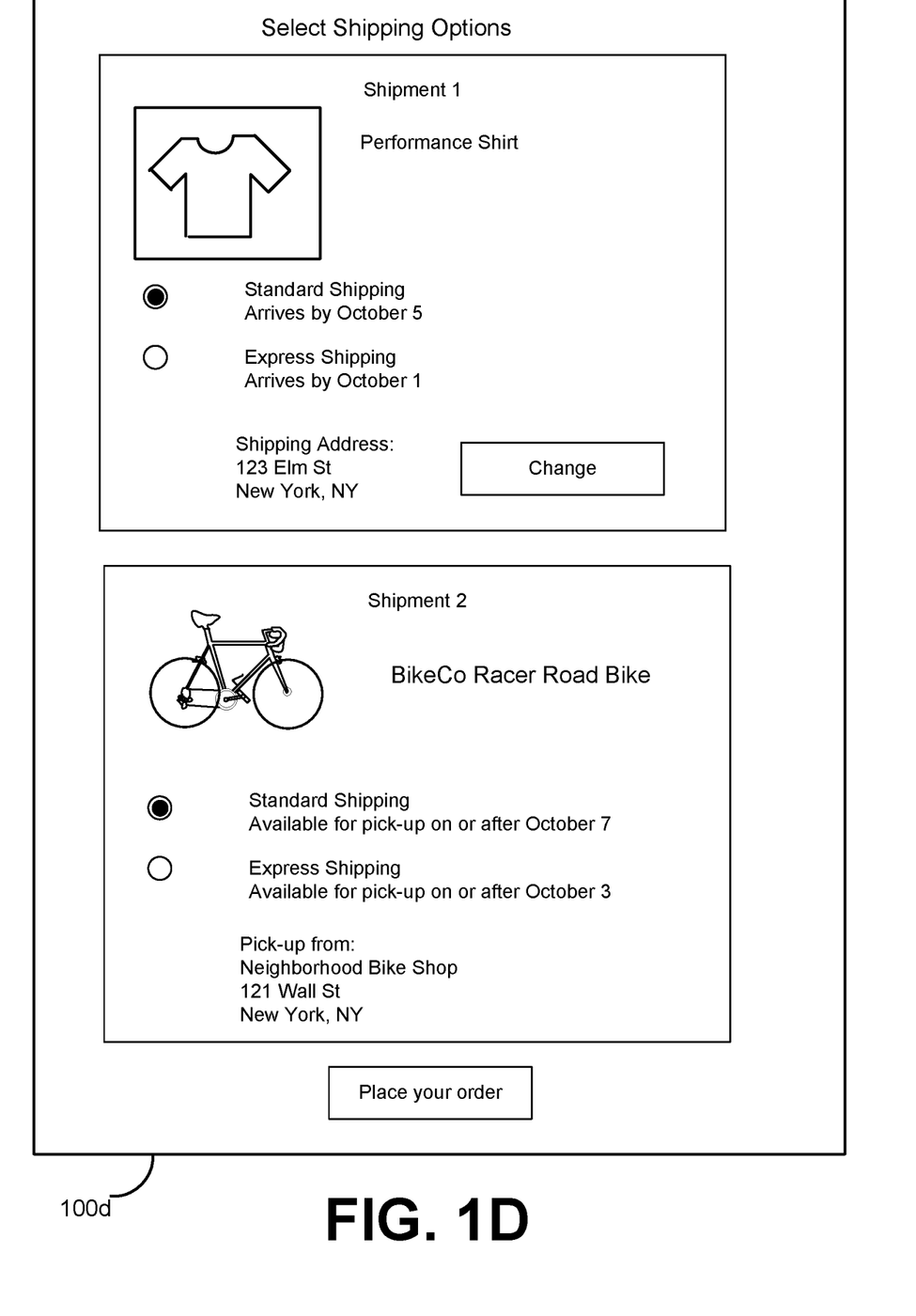

Continuing the example of FIGS. 1A-1C, reference is now made to FIG. 1D, which illustrates an example of a user interface 100d generated by embodiments of the disclosure. In the example of FIG. 1D, a user interface 100d is shown that presents information about the items that are in a bundle as well as other items that are associated with a virtual shopping cart in a particular user session. An item association identifier is generated for the bundle of items that uniquely identifies the bundle within the item universe and within the universe of orders within the data store 212. Information about a service level agreement of a service in the bundle is presented. The service level agreement can be associated with a particular service in a bundle or a particular service provider selected by a user. The service level agreement can specify when a particular service can be completed by the service provider. In this way, the user is informed that she can retrieve her professionally assembled item on or after a date that is calculated based upon when the item arrives at the service provider and the promised turn-around time, or service level agreement, of the service provider.

The user interface can also identify other items in the virtual shopping cart that are not associated with the bundle. Accordingly, a transaction processor that processes transactions such as orders in an electronic marketplace can initiate shipment of certain items to a shipping address associated with a user and initiate shipment of other items to a shipping address associated with a service with which the item is bundled. The shipping address associated with the service can be indicated by one of the items in an item bundle or by a service provider that is selected with respect to one of the items in the item bundle. In some examples, the shipping address associated with the service can be suppressed from the user interface.

Therefore, item bundles can be generated and information about the bundles can be presented through user interfaces as depicted in FIGS. 1A-1D. Other variations of item bundles and how these item bundles can be processed in transactions are discussed below.

Figure 2:
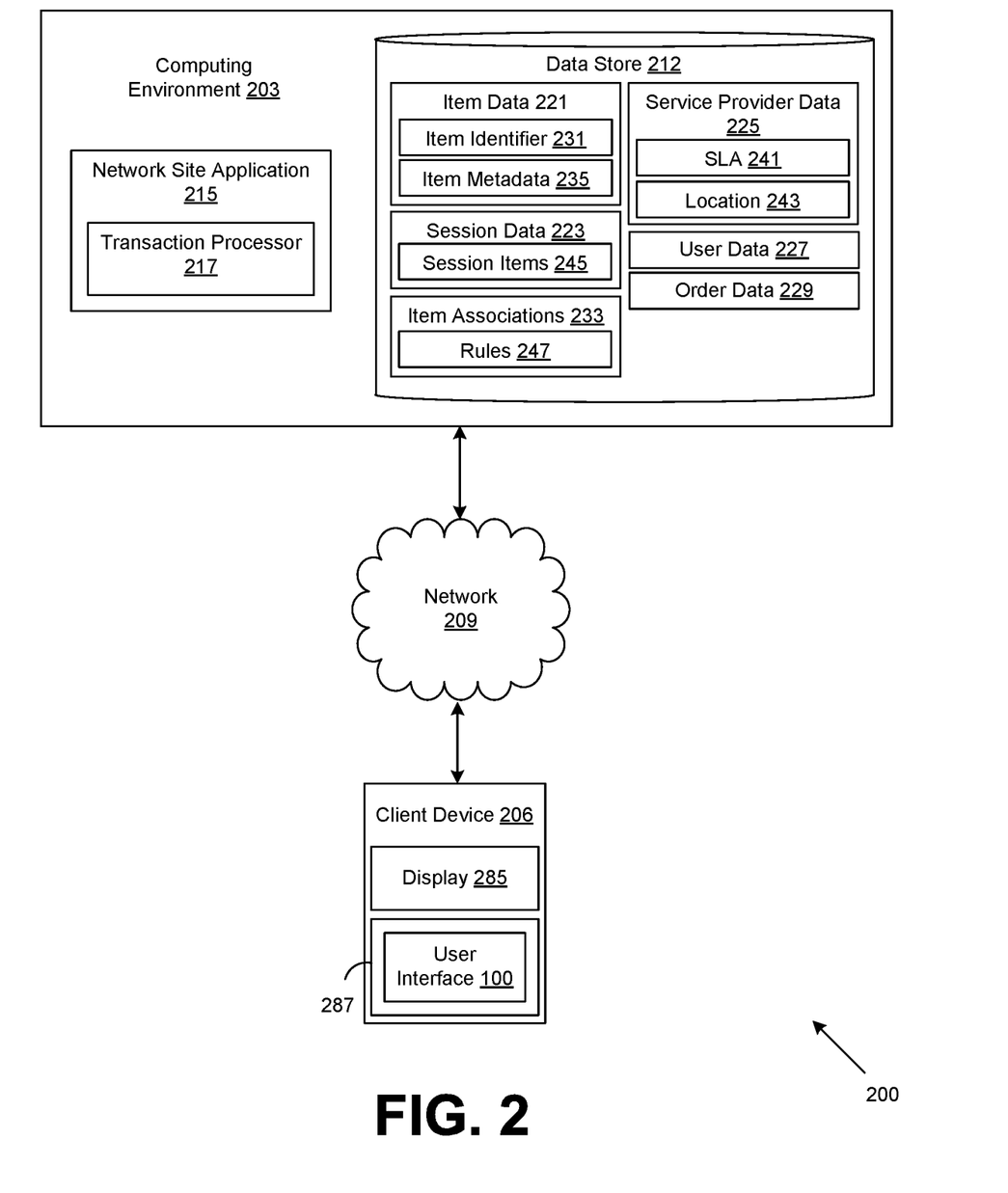
FIG. 2 is a block diagram of a networked environment according to various embodiments of the present disclosure.

With reference to FIG. 2, shown is a networked environment 200 according to various embodiments. The networked environment 200 includes a computing environment 203 and one or more client devices 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a network site application 215, a transaction processor 217, and other applications, services, processes, systems, engines, or functionality not discussed in detail herein. The network site application 215 is executed to serve requests from client devices 206 for content. The network site application 215 can retrieve or generate content pages that can transmitted to a client device 206 over the network 209. In one embodiment, the network site application 215 can generate content pages for an electronic marketplace, a search engine, or any other type of site in which content is generated based upon information about items in an item universe.

The transaction processor 217 is executed to process transactions related to items on behalf of the network site application 215. In one example, the transaction processor 217 can perform searches that are requested by a user and submitted to the network site application 215. The transaction processor 217 can also process purchase transactions for items or item bundles that are purchased by a user from an electronic marketplace. In this scenario, the transaction processor 217 can initiate purchase transactions on behalf of a user and initiate shipment of items to a shipping address of the user or a shipping address of a service provider that is providing a service related to an item.

The data stored in the data store 212 includes, for example, item data 221, session data 223, service provider data 225, user data 227, order data 229, item association 233 and other data that is not depicted that facilitates functioning of the network site application 215 and/or transaction processor 217. Item data 221 includes information about items in an item universe, such as a product catalog. A product in a product catalog can take the form of a physical good that can be shipped to a customer, a virtual good that can be electronically transmitted to a client device 206 of a user, or a service that can be performed for the user by a service provider. Session data 223 includes data about user sessions as users browse a site and interact with content provided by the network site application 215. Session data 223 can track user activity and user behavior within a site as well as store information such as a virtual shopping cart of a user. Item association 233 can represent bundles of two or more items from the item universe that are bundled together and linked with a user session, such as in a user's virtual shopping cart or in an order placed by a user. When items that are linked together are added to a user session or a virtual shopping cart, an item association identifier can be generated that uniquely identifies the item association 233. To this end, session data 223 can include session items 245, or entries that identify the various items from the item universe that are associated with a particular session. The session items 245 that are associated with a bundle of items can in turn be associated with the unique item association identifier that is generated by the network.

In one example, the session items 245 can include a data structure that includes sets or lists of key-value pairs that specify the properties of the items within an order. The session items 245 can also contain an item association identifier that identifies an item association that uniquely identifies a bundle of two or more items. In this way, the transaction processor 217 can process the bundle of two or more items by identifying the item association identifier and initiating shipment of items to an appropriate shipping address of a service provider that might vary from the user's shipping address.

An item association 233 can also be associated with rules 247. Rules 247 can specify requirements for a particular item association 233 that must be enforced by the transaction processor 217 when a particular item association 233 is created and associated with a user session. The rules 247 can be associated with one or more of the items in a bundle within the item data 221. A rule 247 can take the form of a requirement that the transaction processor 217 can enforce with respect to an item bundle. For example, a particular item can be associated with a requirement that it cannot be purchased without bundling with another category of items. As another example, a rule 247 can specify that a promotional discount or other promotional offering can be associated with a particular combination of items from the item universe that are bundled together.

As another example, a rule 247 associated with an item association 233 can be hierarchical. For example, an item association 233 can link together three items, item 1, item 2, and item 3, in a bundle. A corresponding hierarchical rule 247 can specify that item 3 must be associated with item 2, and that item 2 must be associated with item 1. If item 1 is removed from a user session, the transaction processor 217 can remove items 2 and 3 m the session as well. Additionally, if item 2 is removed from the user session, the transaction processor can remove item 3 from the user session. However, because item 3 is at the bottom of the hierarchy, only removing item 3 from the user session would have no effect on items 1 and 2.

In some cases, an item association 233 can be created prior to a user associating specified items with a user session. Additionally, the item association 233 can specify certain customized user interfaces, item properties, bundle properties, or other information specific to a bundle that can be rendered for the user when the item association 233 is linked with a user session.

Service provider data 225 stores information about service providers that are associated with services that are offered for sale or on a complimentary basis through the network site application 215. For example, as noted above in the examples shown in FIGS. 1A-1D, an item can be sold bundled with a separate item such as professional assembly of the item by a service provider locate in proximity to the user's address. Accordingly, the service provider data 225 can assist the transaction processor 217 with locating an appropriate service provider for a particular service that is in proximity to the user's address.

User data 227 includes information about users of a site facilitated by the computing environment 203. User data 227 can include shipping addresses of the user, user credentials or authentication information, payment information, order history, demographic information, or other user data that may be necessary or helpful to operate a network site. Order data 229 includes information about orders that might be processed by the transaction processor 217 in the case of an electronic commerce site. Order data 229 includes information about the items that are ordered, respective shipping addresses associated with each of the items in an order and information about item associations 233, or item bundles, that are associated with an order. In some examples, order data 229 can identify one shipping address for some items within an order and a different shipping address for items linked with an item association 233. Additionally, order data 229 can identify a date on which items linked with an item association 233 will be ready for retrieval from a service provider based upon the SLA 241 of the service provider.

Within item data 221 associated with items in an item universe, each item can be associated with an item identifier 231 that uniquely identifies the item with respect to other items. Item metadata 235 can include other data associated with an item, such as text, images, video, pricing information, or other data fields that might be necessary or helpful to display information about an item in a user interface, ship or sell an item to a buyer, or process transactions for the item within the transaction processor 217. For example, item metadata 235 can identify other items within an item universe that a particular item can be paired with so that an item bundle can be formed within a session or shopping cart of a user.

Within the service provider data 225, a service level agreement (SLA) 241 can specify information about a service that a particular service provider can perform. In one example, the SLA 241 can specify services that the service provider has agreed to perform by identifying one or more item identifiers 231 associated with a service that is listed as an item within the item universe. The SLA 241 can also specify a turnaround time associated with the service, or a time-frame in which a particular service, once commissioned to the service provider, is promised to be delivered. Service provider data 225 can also include a location 243 of the service provider so that the transaction processor 217 can locate one or more service providers based upon their respective proximity to an address of the user or another location that is selected by the user. Service provider data 225 can also include other information about a service provider, such as contact information, other services provided by a service provider, a coverage area of a service provider, and other data.

The client device 206 is representative of a plurality of client devices 206 that can be coupled to the network 209. The client device 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 285. The display 285 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 can also execute a client application 287 that can render a user interface 100 on the display 285. For example, the client application 287 can be executed in a client device 206, for example, to access network content served up by the computing environment 203, thereby rendering a user interface 100 in which information about items and bundles of two or more items can be embedded. To this end, the client application can include, for example, a browser or a special-purpose application, and the user interface 100 can include a network page, an application screen, etc. The client device 206 can also execute applications beyond the client application 287.

Next, additional discussion follows for how bundles of two or more items can be displayed to a user by the network site application 215 and processed by a transaction processor 217. The network site application 215 can generate user interfaces 100 that display information about items within an item universe. The network site application 215 can also generate user interfaces 100 that display information about item bundles.

When rendering a user interface 100 that includes information about a particular item, the network site application 215 can determine whether the item metadata 235 for the item identifies one or more other items with which a particular item is linked. If so, then the network site application 215 can locate another item within the item universe and render information about a bundle of the items. In one example, the other item or items with which the item is linked can include a description, pricing, imagery or other data that the can included within an item detail page for the item. Additionally, the bundle of items can be offered for sale within the user interface at a price level that combines the prices of the respective items that are bundled together. In some examples, the pricing of some items within a bundle can be zero.

When a bundle of items is associated with a user session, such as a virtual shopping cart of a user, the network site application 215 can generate an item association 233 and a corresponding item association identifier that uniquely identifies the bundle of items within the user session. The item association identifier can be embedded within the session data 223 or session items 245 so that the transaction processor 217 can detect the existence of the item association 233 when processing a transaction.

In the event that a particular item within a bundle represents a service performed by a service provider, the physical item(s) within the bundle can be redirected to the service provider rather than to the user. Accordingly, the transaction processor 217, when processing an order from a virtual shopping cart that includes an item association identifier, can also allow a user to select a service provider that is identified as eligible or qualified to perform a service in the bundle. The transaction processor 217 can also allow the user to select or filter service providers based on proximity to the user's location, based upon terms of the SLA 241, or other properties. Upon selection of a service provider associated with a service in a bundle, the transaction processor 217 can then create a session items 245 data structure that includes the various details of the order, such as payment information, shipping addresses, information about an applicable SLA 241, and other order data. The transaction processor 217 can then process payment for the order and initiate shipment of the item in the bundle to a shipping address associated with the selected service provider.

The transaction processor 217 can also calculate a date or timeframe in which the selected service, such as assembly of a bike, will be completed based upon the SLA 241. The information about the items in the bundle and the SLA 241 can be included within a user interface 100 that is generated for the user. The user interface 100 can include one that displays a virtual shopping cart, an order confirmation, or any other form of user interface that includes information about the items and the SLA 241.

Figure 3:
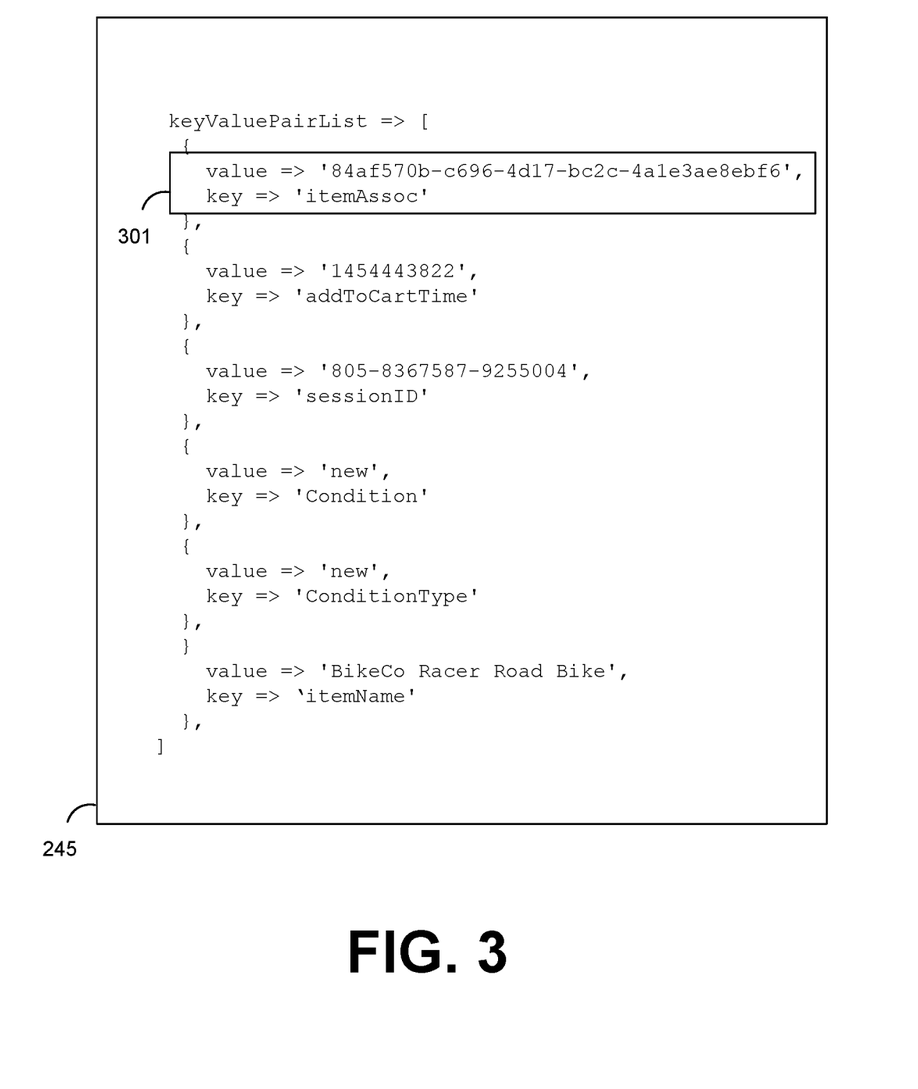
FIGS. 3-4 illustrate an example order document according to embodiments of the disclosure.

Referring to FIG. 3, shown is an example of session items 245, which can represent a virtual shopping cart or another representation of a user session. The session items 245 data structure can include key-value pairs associated with items that are in a bundle of items. The session items 245 can be generated by the network site application 215 for processing by the transaction processor 217 and include various properties associated with items in an order placed by a user in a network site. In other embodiments, the session items 245 can represent items that are associated with a user session or a virtual shopping cart prior to completion of an order. In a non-electronic commerce context, the session items 245 can represent a collection of search results or other items that are processed by the transaction processor 217.

The session items 245 data structure contains key-value pairs that identify information that the transaction processor 217 can analyze to determine how to process a transaction. For example, session items 245 can identify the items in an order placed by a user by their respective item identifiers 231. Additionally, the session items 245 data structure can identify that a particular item is bundled with another item by identifying an item identifier. In the example of FIG. 3, the item association identifier is included in a key-value pair denoted by reference numeral 301. The item association identifier corresponds to an item association 233 that is generated by the network site application 215 when the items were associated with a user session or a virtual shopping cart. As noted above, the item association identifier can uniquely identify a bundle of items within the item universe and within user sessions with respect to other item associations 233. The network site application 215 can also include item metadata that within the session items 245 data structure is required by the transaction processor 217 to subsequently process a transaction with the item bundle identified by the item association identifier.

Figure 4:
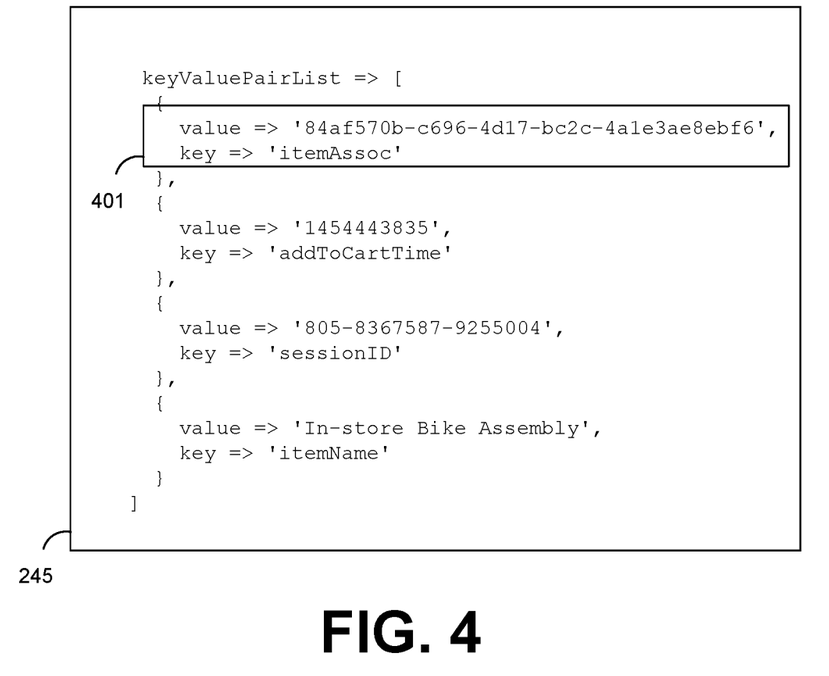

Continuing the example of FIG. 3, reference is now made to FIG. 4, which illustrates a different portion of the session items 245 data structure that includes information about an item with which the item in FIG. 3 is bundled. As depicted in FIG. 4 by reference numeral 401, the session items 245 data structure includes the same item association identifier as in the example in FIG. 3. Accordingly, to generate the portion of the session items 245 data structure shown in FIG. 4, the network site application 215 can also include the item association identifier that uniquely identifies the bundle of items within the key-value pairs associated with the item. The network site application 215 or transaction processor 217 can also display information related to the items within the bundle. If one of the items within the bundle is a service, the network site application 215 and transaction processor 217 can also display information related to the SLA 241 of one or more service providers.

Figure 5:
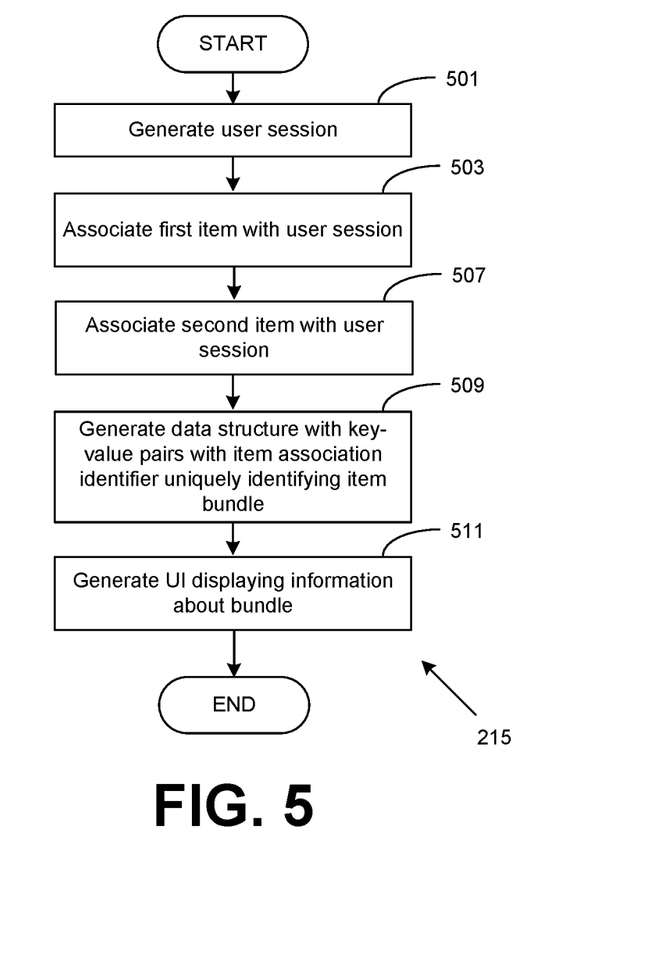
FIGS. 5-6 are flowcharts illustrating examples of functionality implemented as portions of a computing environment in the networked environment of FIG. 2 according to various embodiments of the present disclosure.

Referring next to FIG. 5, shown is a flowchart that provides one example of the operation of a portion of the network site application 215 according to various embodiments. It is understood that the flowchart of FIG. 5 provides merely an example of the many different types of functional arrangements that may be employed to implement the operation of the portion of the network site application 215 as described herein. As an alternative, the flowchart of FIG. 5 can be viewed as depicting an example of elements of a method implemented in the computing environment 203 according to one or more embodiments. FIG. 5 illustrates an example of how the network site application 215 can generate a session items 245 data structure corresponding to a virtual shopping cart or user session that includes an item bundle.

Beginning with box 501, the network site application 215 can generate a user session. In some scenarios, a virtual shopping cart can be associated with a user session. In other scenarios, a user session might be associated with a search engine, in which case the user session can include a search history or other items that a user has selected or indicated an interest in during the session. At box 503, the network site application 215 can associate a first item with the user session. The first item can be associated with a user session in response to a user adding the first item to a virtual shopping cart. The first item is linked with one or more other items that can be bundled together in an item bundle. At box 507, the network site application 215 can associate a second item with the user session. The first item and second item can be linked together within an item universe, such as a product catalog. In some examples, the first item and second item can be added to the user session as a single atomic transaction.

At box 509, the network site application 215 can generate a session items 245 data structure with key-value pairs containing item metadata 235 corresponding to the first item and second item. The network site application 215 can also generate an item association 233 that uniquely identifies the association between the first item and second item. The network site application 215 can also generate a unique item association identifier that can be placed within the session items 245 data structure. The item association identifier can be placed within entries that correspond to the first item and the second item so that the transaction processor 217, when processing a transaction, can detect that the two items are linked together in a bundle of items. At box 511, the network site application 215 can generate a user interface 100 that displays information about the first item, second item and optionally a service provider or SLA 241 associated with the bundle. In some examples, the user interface 100 can allow the user to select a particular service provider associated with a service based upon a location of the service provider, an SLA 241 of the service provider, or other aspects of one of the items or service provider.

In some examples, the network site application 215 can calculate a date or time on or after which an item corresponding to the bundle will be ready or completed based upon the SLA 241. Determination of such a date or time can take into account the SLA 241 specified by the service provider, transit or shipment time of an item to a service provider, a number of business days from an expected delivery of the item to the service provider.

Figure 6:
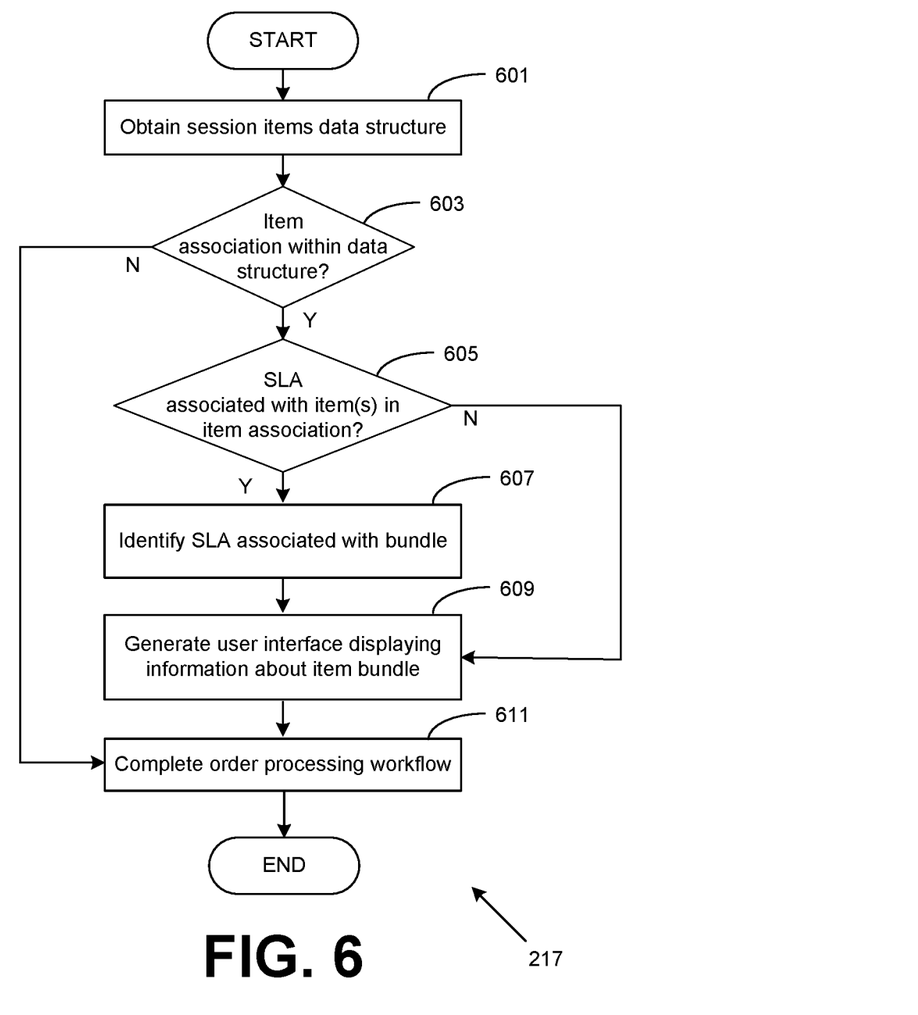

Referring next to FIG. 6, shown is a flowchart that provides one example of the operation of a portion of the transaction processor 217 according to various embodiments. It is understood that the flowchart of FIG. 6 provides merely an example of the many different types of functional arrangements that may be employed to implement the operation of the portion of the transaction processor 217 as described herein. As an alternative, the flowchart of FIG. 6 can be viewed as depicting an example of elements of a method implemented in the computing environment 203 according to one or more embodiments. FIG. 6 illustrates an example of how the transaction processor 217 can process a session items 245 data structure that includes an item association 233.

At box 601, the transaction processor can obtain a session items 245 data structure that includes key-value pairs corresponding to items in a user session. As noted above, a user session can correspond to a virtual shopping cart. At box 603, the transaction processor 217 can determine whether the session items 245 contain an item association identifier corresponding to an item association 233. If not, the process can proceed to box 611, where the transaction processor 217 can continue with the order processing workflow and process the transaction without regard to items within the order being bundled together. If so, the process can proceed to box 605, where the transaction processor 217 can determine whether the item association 233 is associated with a service provider and an SLA 241. The transaction processor 217 can make such a determination if one of the items linked together by the item association 233 is associated with a service provider and an SLA 241.

If the item association 233 is not associated with a service provider and an SLA 241, the process can proceed to box 609, where the transaction processor 217 can generate a user interface 100 that displays information about the item bundle of the first and second items. If the item association 233 is associated with an SLA 241, the transaction processor 217 can proceed to box 607, where the SLA 241 is identified. In some examples, a date or time associated with the SLA 241 of the service provider that is associated with the item bundle. As noted above, the SLA 241 identifies when a service performed by the service provider is expected to be completed upon delivery of a physical item to the service provider. The transaction processor 217 can determine, based upon an expected delivery date to the service provider, a completion date on or after which a user can obtain the physical item after the service is performed by the service provider. In one scenario, the service can be an assembly or repair service for another item in the item bundle.

The user interface 100 can include information about the first item, the second item (and other items that might be bundled within the item bundle), and the SLA 241. The user interface 100 can include an order confirmation. The user interface 100 can also include additional elements that permit a user to select a different service provider for the second item based upon the user's location, shipping address, or other preferences. In some examples, the transaction processor 217 can also generate an order data structure corresponding to a completed order that is stored within the order data 229. The order data structure can identify the date that is calculated based upon the SLA 241 as well as other information about the order that can be communicated to a user and archived in the data store 212. Thereafter, the process proceeds to completion.

Figure 7:
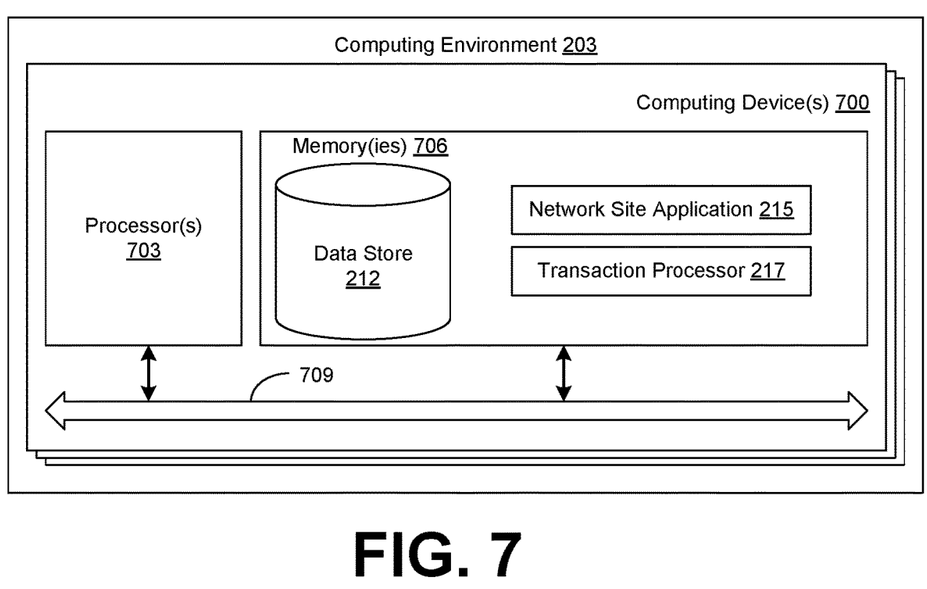
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network site application 215 the transaction processor 217, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the network site application 215, the transaction processor 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 shows the functionality and operation of an implementation of portions of the network site application 215 and the transaction processor 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 shows a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site application 215 and the transaction processor 217, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network site application 215 and the transaction processor 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   generating a user session associated with a user of a network site;
   associating a first item from an item universe and at least one other item from the item universe to the user session;
   generating an item association identifier that uniquely identifies an association between the first item and the at least one other item in response to the first item and the at least one other item being associated with the user session;
   identifying a location associated with the user based upon user account data associated with the user;
   identifying a service provider in proximity to the location from among a plurality of service providers associated with the at least one other item;
   identifying a service level agreement of the service provider with respect to the at least one other item; and
   generating, a user interface with a first region displaying information about a third item associated with the user session, and a second region displaying information about the first item, the at least one other item, and the service level agreement, and a user interface element which, when selected, causes a transaction processor to process a first transaction associated with the first item and the at least one other item, and a second transaction associated with the third item, wherein the transaction processor enforces at least one rule based at least in part on the item association identifier that uniquely identifies the association between the first item and the at least one other item.

2. The method of claim 1, wherein the at least one other item comprises an assembly service associated with the first item.

3. The method of claim 1, wherein the service level agreement specifies a processing time associated with the first item and the at least one other item.

4. The method of claim 1, further comprising obtaining a user selection of the service provider from among the plurality of service providers.

5. The method of claim 1, wherein generating the user interface further comprises:
   rendering shipment information associated with the third item; and
   suppressing shipment information associated with the at least one other item.

6. The method of claim 1, wherein the at least one rule is associated with a requirement that the at least one other item cannot be purchased without the first item.

7. A system, comprising:
   at least one computing device; and
   at least one application that is configured to cause the at least one computing device to at least:
   associate a first item from an item universe and a second item from the item universe with a user session in a network site;
   generate an item association identifier that uniquely identifies an association between the first item and the second item in response to the first item and the second item being associated with the user session;
   identify a service level agreement associated with the second item;
   generate order data comprising a shipping address associated with the second item; and
   generate a user interface with a first region displaying information about a third item associated with the user session, a second region displaying information about the first item, the second item, and the service level agreement, and a user interface element which, when selected, causes a transaction processor to process a first transaction associated with the first item and the second item, and a second transaction associated with the third item, wherein the transaction processor enforces at least one rule based at least in part on the item association identifier that uniquely identifies the association between the first item and the second item.

8. The system of claim 7, wherein the at least one application is further configured to cause the at least one computing device to at least identify a date following delivery of the first item to a shipping address that the first item will be_available to a user based upon the service level agreement.

9. The system of claim 8, wherein the shipping address associated with the second item is different from a shipping address associated with a user corresponding to a virtual shopping cart.

10. The system of claim 8, wherein generating the user interface further comprises:
suppressing rendering of the shipping address associated with the second item in the user interface.

11. The system of claim 7, wherein the at least one application is further configured to cause the at least one computing device to at least:
identify a completion date associated with a service based upon the service level agreement, wherein the completion date is different from a shipment date associated with a shipment of the first item; and
include the completion date in the user interface.

12. The system of claim 11, wherein the second item is associated with a service provider performing a service with respect to the first item.

13. The system of claim 11, wherein the at least one application is further configured to cause the at least one computing device to at least:
identify a plurality of service providers associated with the service that are within a proximity radius of a location associated with a user corresponding to the user session;
render the plurality of service providers within the user interface; and
obtain a selection of a service provider from among the plurality of service providers.

14. The system of claim 7, wherein the at least one application is further configured to cause the at least one computing device to at least:
initiate delivery of the third item to a shipping address that is not a shipping address associated with the second item.

15. The system of claim 7, wherein the at least one application is further configured to cause the at least one computing device to at least validate whether the first item is present in a virtual shopping cart.

16. A method, comprising:
associating a first item, a second item, and a third item with a user session in a network site;
generating an item association identifier corresponding to an association of the first item with the second item, wherein the item association identifier uniquely identifies the association of the first item with the second item, in response to the first item and the second item being associated with the user session;
identifying a plurality of service providers associated with the second item;
obtaining a user selection of one of the service providers; and
generating a user interface with a first region displaying information about the third item, a second region displaying information about the first item and the second item, and a user interface element which, when selected, causes a transaction processor to process a first transaction associated with the first item and the second item, and a second transaction associated with the third item wherein the transaction processor enforces at least one rule based at least in part on the item association identifier that uniquely identifies the association of the first item with the second item.

17. The method of claim 16, wherein identifying the plurality of service providers associated with the second item further comprises identifying the plurality of service providers based upon a proximity to a location associated with a user.

18. The method of claim 16, further comprising:
identifying a completion date associated with the second item based upon a service level agreement associated with the one of the service providers, wherein the completion date is different from a shipment date associated with a shipment of the first item.

19. The method of claim 16, further comprising validating whether the first item is present in the user session.

20. The method of claim 16, further comprising suppressing rendering of a shipping address associated with the second item in the user interface.

* * * * *